US011999364B2

(12) United States Patent
Alvarez et al.

(10) Patent No.: US 11,999,364 B2
(45) Date of Patent: Jun. 4, 2024

(54) SYSTEMS AND METHODS FOR INTRUSION DETECTION IN VEHICLE SYSTEMS

(71) Applicant: Intel Corporation, Santa Clara, CA (US)

(72) Inventors: Ignacio J. Alvarez, Portland, OR (US); Maria Soledad Elli, Hillsboro, OR (US); Javier Felip Leon, Hillsboro, OR (US); Javier Sebastian Turek, Beaverton, OR (US); David Israel Gonzalez Aguirre, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 651 days.

(21) Appl. No.: 17/133,074

(22) Filed: Dec. 23, 2020

(65) Prior Publication Data
US 2021/0114606 A1   Apr. 22, 2021

(51) Int. Cl.
B60W 50/02    (2012.01)
B60W 50/029   (2012.01)
B60W 50/038   (2012.01)
H04L 9/40     (2022.01)
B60W 50/04    (2006.01)

(52) U.S. Cl.
CPC ...... *B60W 50/0205* (2013.01); *B60W 50/029* (2013.01); *B60W 50/038* (2013.01); *H04L 63/1416* (2013.01); *B60W 2050/0292* (2013.01); *B60W 2050/046* (2013.01)

(58) Field of Classification Search
CPC ........... B60W 50/0205; B60W 50/029; B60W 50/038; H04L 63/1416

USPC ...................................................... 340/426.24
See application file for complete search history.

(56) References Cited

U.S. PATENT DOCUMENTS

| | | | |
|---|---|---|---|
| 11,037,387 B1* | 6/2021 | Elangovan | G07C 9/00309 |
| 11,110,895 B2* | 9/2021 | Maluf | B60R 25/34 |
| 2018/0025156 A1* | 1/2018 | Dagan | H04L 63/1483 713/161 |
| 2018/0262466 A1* | 9/2018 | Atad | H04L 63/1425 |
| 2020/0226274 A1 | 7/2020 | Juliato et al. | |
| 2021/0203682 A1* | 7/2021 | Bajpai | G06F 21/55 |
| 2021/0258328 A1* | 8/2021 | Appel | H04L 67/12 |
| 2021/0291849 A1* | 9/2021 | Meng | H04L 63/1425 |

OTHER PUBLICATIONS

Kansal, A. et al., "Sensing Uncertainty Reduction Using Low Complexity Actuation", Technical Reports, Center for Embedded Network Sensing, Nov. 30, 2003, 17 pp.
S. Shalev-Shwartz et al., "On a Formal Model of Safe and Scalable Self-driving Cars", Mobileye, 2017.

(Continued)

*Primary Examiner* — Kerri L McNally
(74) *Attorney, Agent, or Firm* — Banner & Witcoff Ltd.

(57) ABSTRACT

A vehicle control system (VCS) for a vehicle may include an in-vehicle bus and an intrusion detection system (IDS). The IDS may: calculate a planned output of the vehicle based on a message of a message stream received from at least one electronic control unit (ECU) coupled to the in-vehicle bus, calculate a reachable set based on an uncertainty metric, and identify an intrusion of the VCS based on a comparison of the planned output and the reachable set.

24 Claims, 12 Drawing Sheets

(56) References Cited

OTHER PUBLICATIONS

L. Mi et al., "Training-Free Uncertainty Estimation for Neural Networks", Work In Progress, Sep. 28, 2019.
Y.D. Hao et al., "Uncertainty Analysis and Optimization of Automotive Driveline Torsional Vibration with Driveline and Rear Axle Coupled Model", 2018—Engineering Optimization, 50(11), 1871-189.
L. J. Guibas et al., "Zonotopes as Bounding Volumes", pp. 803-812, 2003.
M. Althoff et al., "Model-Based Probabilistic Collision Detection in Autonomous Driving", IEEE Transactions on Intelligent Transportation Systems, vol. 10, No. 2, Jun. 2009, pp. 299-310.
R. E. Allen et al., "A Machine Learning Approach for Real-Time Reachability Analysis", Department of Aeronautics and Astronautics, 7 pgs., 2014.
A. Girard et al., "Efficient Computation of Reachable Sets of Linear Time-Invariant Systems with Inputs", Department of Electrical and Systems Engineering, 2006 pp. 257-271.
V. Izosimov et al., "Security Evaluation of Cyber-Physical Systems in Society-Critical Internet of Things", Machine Design, The Royal Institute of Technology, Stockholm, Sweden, 2016—6 pp.
G. R. Terrell et al. "Variable kernel density estimation", The Annals of Statistics, 1236-1265 (1992).
S. J. "Qin Survey on data-driven industrial process monitoring and diagnosis" Annual reviews in control, 36(2), (2012) 220-234.
A. Greenberg, Hackers Remotely Kill a Jeep on the Highway—With Me in It, 14 pp., Jul. 21, 2015.

* cited by examiner

SYSTEMS AND METHODS FOR INTRUSION DETECTION IN VEHICLE SYSTEMS

TECHNICAL FIELD

Various aspects of this disclosure generally relate to vehicle control systems, and more particularly, to systems and methods for assuring secure and safe communications over an in-vehicle network (IVN) of a vehicle control system.

BACKGROUND

Automated vehicles utilize reliable vehicle control and safety systems that process data acquired at a vehicle. By using data acquired at the vehicle, which may include data about the vehicle's environment or data about the vehicle itself, the vehicle may alter its movements, modify its positioning with respect to external elements, and/or respond to newly detected events. The vehicle control and safety systems include various controller units, actuator units, and sensor units distributed throughout the vehicle. The various components communicate data with each other over an in-vehicle network (IVN).

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

Figure 1:
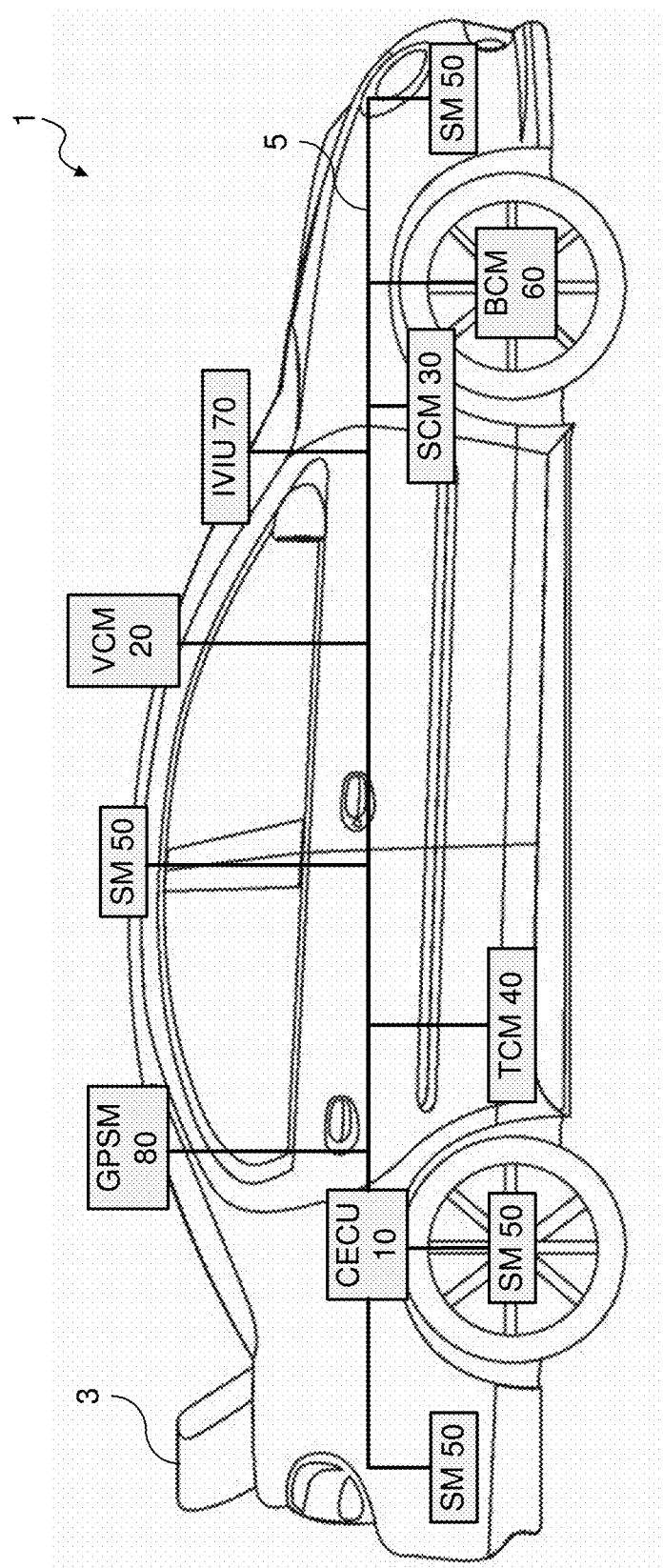
FIG. 1 shows an exemplary vehicle control system for an automated vehicle in accordance with various aspects of the present disclosure.

The exemplary aspects of the present disclosure will be described with reference to the accompanying drawings.

The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Data-driven process monitoring may encounter issues that include fault detection, identification, reconstruction, and diagnosis of faults. The data and performance of the system may be modeled using latent variable methods such Principal Component Analysis and Partial Least Squares. However, these processes are not applied to detection of malicious attacks and are known to have large variabilities that may significantly impact the operation of automated vehicles. The present disclosure includes instruction detection systems that are configured to provide a reachability set calculation that considers variables in dynamic environments and provides the detection and counteraction of malicious attacks.

The vehicle control systems of many modern vehicles include numerous different electronic control units (ECUs) disposed in various parts of the vehicle. An ECU may be an embedded system in a vehicle that controls one or more electrical systems or subsystems in the vehicle. For instance, an automated vehicle may include an engine control module (ECM), a transmission control module (TCM), a steering control module (SCM), a brake control module (BCM), a global positioning system (GPS) module (GPSM), a vision control module (VCM), a heading control module (HCM), an in-vehicle infotainment unit (IVIU), etc. Some ECUs are fundamentally important for safety, e.g., steering ECU, braking ECU, airbag ECU. The ECUs may be connected to an in-vehicle network (IVN) that allows the ECUs to communicate with each other, so that one ECU may use data obtained from another ECU. The in-vehicle network may include one or more buses. The ECUs may be interconnected with one or more buses. IVNs can employ a heterogeneous set of buses.

An ECU may include at least one processor and at least one memory with software that executes on the at least one processor to cause that ECU to perform the desired operations. Such at least one processor and at least one memory may be referred to as a microcontroller unit (MCU), and such software may be referred to as firmware.

An attacker may be able to load malicious software ("malware") into an ECU. The malware may cause the ECU to perform malicious operations and can compromise vehicle, road, and passenger safety.

A vehicle control system requires data and signals to be reliably communicated among the ECUs from one or more of the in-vehicle networks. The safety and security of an automated vehicle can be severely affected by attacks launched against ECUs and against the IVN. One attack vector is to compromise an ECU with malware that causes the ECU to masquerade as a different ECU in the IVN. An ECU compromised by spoofing or masquerading attacks may disguise communications from an unknown source as being from a known, trusted source to affect safety. In this kind of attack, an adversary may inject messages into the in-vehicle network on behalf of an authentic ECU.

For example, an ECU (e.g., any ECU on the IVN) could be compromised and become a rogue ECU masquerading as a speedometer. For example, the malware may cause the rogue ECU to intercept and resend messages to make it seem to have originated at the speedometer, and those messages may include malicious data, such as incorrect velocity information of the vehicle. Vehicle control systems rely on information about the vehicle's speed received from the IVN to perform safety-critical functions such as collision warnings, emergency braking, etc. By compromising this information or signal, an attacker can adversely impact main safety features that are the underlying foundation to ensure road and passenger safety.

For another example, ECUs with external connectivity may be targeted and compromised via a remote attack. For instance, an in-vehicle infotainment unit, IVIU, may have external connectivity (e.g., Wi-Fi or cellular) and internal connectivity (e.g., IVN). Malware installed in an IVIU via the external connectivity may cause the IVIU to masquerade as the vision control module, VCM, on the IVN. In particular, the malware may cause the IVIU to send messages that seem to have originated at the VCM, and those messages may include malicious data, such as incorrect information about whether the vehicle is within a desired lane, thereby causing the vehicle to veer off of the road.

For another example, ECUs may also be compromised by a direct attack on the IVN. For instance, a device may be plugged directly into the IVN (e.g., via a port of an on-board diagnostics system of a vehicle, such as an OBDII port) and be recognized as one of the ECUs of the vehicle control system. Such a device may be used to launch a masquerade attack or replay attack.

Intrusion detection techniques, while helpful to detect attacks, often present false positive/negative rates that can allow attackers to impact safety. In particular, intrusion detection techniques provide a good level of assurance of the integrity of in-vehicle network (IVN) messages. However, malicious messages may be injected with a sufficiently high frequency so as to exploit false negatives to evade intrusion detection. Thus, by mounting such an attack, adversaries can maximize their impact against the system.

Attackers may also employ replay attacks which delay, replay, or repeat valid messages to misdirect a receiving ECU into believing a rogue ECU is an authentic ECU. Replay attacks end up being similar to injection attacks from an IDS perspective. Such an attack can also exploit false positive and false negatives of an IDS through a high frequency of replay or repetition. A high frequency injection is how an attacker would maximize the changes of being successful. Though most of the malicious traffic would be intercepted by the IDS, a fraction of it would be misclassified. The small percentage of malicious traffic that slips through can still cause harm. Consequently, it is desirable to introduce additional assurance layers that reduce effects of false negatives, while not incurring overheads prohibitive for real-time execution.

FIG. 1 is a block diagram of an exemplary vehicle control system 1 for an automated vehicle 3. Referring to FIG. 1, vehicle control system (VCS) 1 includes various ECUs that communicate with each other via an in-vehicle network or bus 5 to control the movement and/or operation of the automated vehicle 3. For purposes of this disclosure, an ECU in a VCS may be referred to as a node. For purposes of illustration, VCS 1 is shown as a control system for a ground vehicle. Referring to FIG. 1, the nodes in VCS 1 may include a central ECU 10, a vision control module (VCM) 20, steering control module (SCM) 30, a transmission control module (TCM) 40, various sensor modules 50, a brake control module (BCM) 60, an in-vehicle infotainment unit (IVIU) 70, and a global positioning system (GPS) module (GPSM) 80. The various sensor modules 50 may include a LIDAR sensor, ultrasonic sensors, and speedometers. While automated vehicle 3 is depicted as a ground vehicle, aspects of this disclosure may be equally or analogously applied to aerial vehicles such as drones or aquatic vehicles such as boats. Furthermore, the quantities and locations of ECUs, as well as relational distances (as discussed above, the figures are not to scale) are provided as examples and are not limited thereto. The ECUs of automated vehicle 3 may be arranged around a vehicular housing, mounted on or outside of the vehicular housing, enclosed within the vehicular housing, or any other arrangement relative to the vehicular housing where the ECUs move with automated vehicle 3 as it travels. The vehicular housing, such as an automobile body, drone body, plane or helicopter fuselage, boat hull, or similar type of vehicular body dependent on the type of vehicle.

The in-vehicle network 5 may include one or more of the following networks or buses: Controller Area Network (CAN bus), CAN-FD, FlexRay bus, MOST network, Local Interconnect Network (LIN bus), Bluetooth bus, Wi-Fi, cellular, and automotive Ethernet. For example, an automotive CAN bus system can allow ECUs to communicate with each other without complex dedicated wiring. A message communicated on the in-vehicle network by the nodes may be structured in a frame or packet according to a predefined format. The message may include an identification field, a control field, and a data field.

The identification field in each message includes a message identifier (message ID) that identifies a message type and/or a source node of the respective message. For example, in a CAN bus system, each message ID is associated with only one node. However, a single node may use different message IDs for different types of messages. However, a node is not supposed to use any message ID that is associated with any other node. Other buses or networks may allow different associations of message identifiers and nodes.

The data field in each message includes content or payload that includes data information acquired at the source node and communicated to other nodes. The data information may include sensor measurements, data samples, operational status, control commands, etc.

Referring to FIG. 1, the in-vehicle network or bus 5 may be a controller area network (CAN) bus. Messages may be communicated based on the CAN bus extended frame format, with the message ID situated at or very near the beginning of the frame. As indicated above, the message ID is a fundamental piece of information that is supposed to identify the source of the message. In other words, the message ID is supposed to indicate which node the message "belongs to." The message ID may also identify the message type.

Figure 2:
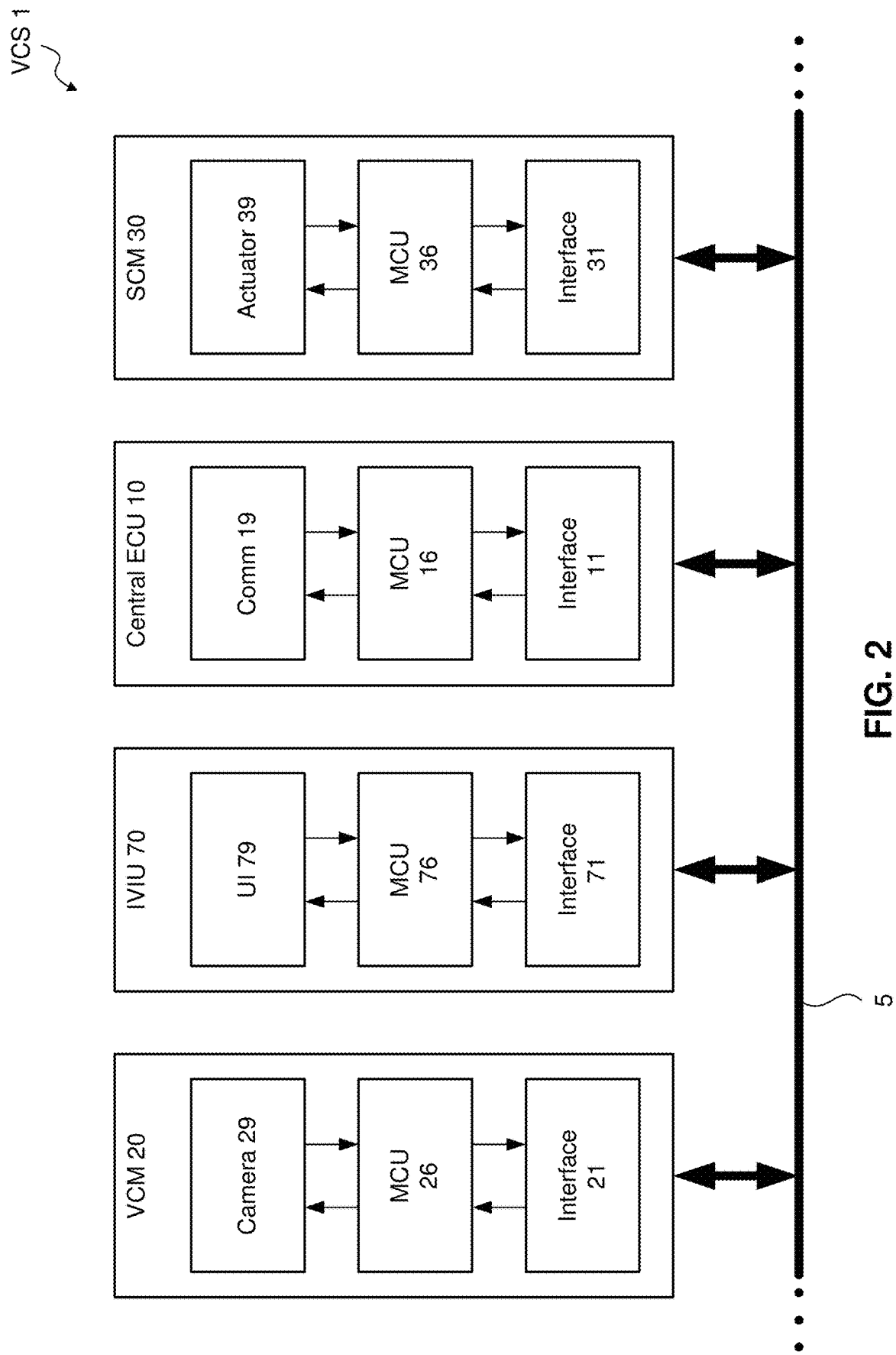
FIG. 2 shows various exemplary electronic control units of a vehicle control system of FIG. 1 in accordance with various aspects of the present disclosure.

FIG. 2 is a block diagram of the vehicle control system of FIG. 1, with additional details for certain nodes. FIG. 2 is a block diagram of VCS 1, with additional details for central ECU 10, VCM 20, SCM 30, and IVIU 70. For purposes of clarity and brevity, not all nodes of VCS 1 are shown and not all of the nodes shown are described in detail. However, most ECUs may operate substantially as described below with regard to VCM 20.

Referring to FIG. 2, VCM 20 includes an MCU 26 (which includes firmware 28), a camera 29, and an interface 21.

MCU 26 is responsible for running firmware 28 to operate the camera 29, to process image data acquired by the camera 29, to generate information based on the processed image data, and to communicate the generated information. The generated information may include information about the position of other agents, the position of road surface markings/indications, traffic signals, the speed of the ego vehicle, other perceived information, etc.

The camera 29 may be configured to monitor the vehicle's surroundings (roads, vehicles, pedestrians, etc.) and recognize and read traffic lights and traffic signs. For example, MCU 26 may process the image data acquired by camera 29 to generate voxel maps detailing the environment surrounding of the ego vehicle. MCU 26 may use data provided by other ECUs to generate voxel maps and perform image recognition.

VCM 20 may include a bus controller that receives outgoing data from MCU 26, creates frames, sends frames as digital data, arbitrates bus conflicts, detects errors, etc. The bus controller (not shown) may be implemented as part of the same chip or package as MCU 26 or as a distinct, stand-alone chip or package, external to the MCU chip or package. The bus controller may be a CAN controller responsible for the entire CAN protocol.

In particular, a CAN bus system achieves high levels of reliability with a single pair of differential signals, referred to as CAN high (CANH) and CAN low (CANL). Each node connected to a CAN bus has an associated set of unique message identifiers, i.e., each message identifier is exclusive to a node and does not overlap with any other nodes. The message identifier may also be used to identify the type of message received (e.g., to acquire the signals carried by the payload of the message) and to resolve bus arbitration.

In a CAN bus system, each node is only supposed to use one of its own message identifiers when generating messages. So at a receiving node, it may be difficult or impossible to determine which node actually sent a given message. Due to the absence of a built-in authentication mechanism, a compromised node may send a message with any message identifier to the bus. Consequently, malicious messages may be sent by any compromised node. In the case of vehicles, compromised ECUs may masquerade as other critical systems, such as the ECUs responsible for braking, acceleration and steering. However, nodes with a message assurance system according to the present disclosure may fully address such vulnerabilities.

If the in-vehicle network is an analog-based bus, interface 21 may be a transceiver responsible for converting the digital data received from the bus controller to the analog levels of the physical channel. Interface 21 also reads the bus and feeds that information back to the bus controller, to enable the bus controller to perform operations such as arbitration and error checking.

The MCUs, bus controllers, and interfaces in the other nodes operate similarly. However, instead of a camera 29, an MCU may be connected to a sensor, actuator, or another communications device. For example, in other nodes, the MCU may be responsible for operating a sensor (e.g., LIDAR, radar, ultrasonic, odometry, velocity, acceleration, gyroscopic etc. sensors), actuator (e.g., gearbox, throttle, steering, brakes, etc.), or a communications interface (e.g., cellular, WiFi, another in-vehicle bus, user interface). With reference to FIG. 2, SCM 30 includes an MCU 36 that operates an actuator 39 configured to steer the automated vehicle, IVIU 70 includes an MCU 76 that operates an interface configured to receive passenger input and/or display a status of the automated vehicle, and central ECU 10 includes an MCU 16 that operates a communications interface 19 (e.g., an external cellular communications) configured to transmit and/or receive environmental traffic information (e.g., vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols).

Sensors may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each ECU having a sensor may be configured to observe a particular type of data of the automated vehicle's environment and may forward the data to a central ECU 10 in order to provide the vehicle with an accurate portrayal of the vehicle's environment.

Sensors may include measurement devices for measuring vehicle-state parameters, such as a velocity sensor (e.g., a speedometer) for measuring a velocity of the automated vehicle, one or more accelerometers (either single axis or multi-axis) for measuring accelerations of the automated vehicle along one or more axes, a gyroscope for measuring orientation and/or angular velocity, odometers, altimeters, thermometers, etc.

Actuators may include components of an automated vehicle related to steering and movement. In ground vehicles, actuators may include an engine, a transmission, brakes, a steering wheel, etc. In aerial vehicles, actuators may include one or more of rotors, propellers, jet engines, wings, rudders or wing flaps, air brakes, a yoke or cyclic, etc. In aquatic or sub-aquatic vehicles, actuators may include any one or more of rudders, engines, propellers, a steering wheel, etc.

Communication devices may include one or more radio frequency (RF) transceivers to facilitate mobility coordination with other nearby vehicular communication devices and/or central networking components that perform decisions and/or computations related to automated driving. Communication devices may also include position devices for determining a position of the automated vehicle. For example, this may include global position system (GPS) or other global navigation satellite system (GNSS) circuitry configured to receive signals from a satellite system and determine a position of the automated vehicle.

At least one ECU (e.g., central ECU 10) of VCS 1 may also include software that operates a safety driving model to implement an advanced driver automation system (ADAS) or AV system. Alternatively, a plurality of ECUs may include software to cooperatively operate a safety driving model to implement an ADAS or AV system.

Figure 3A:
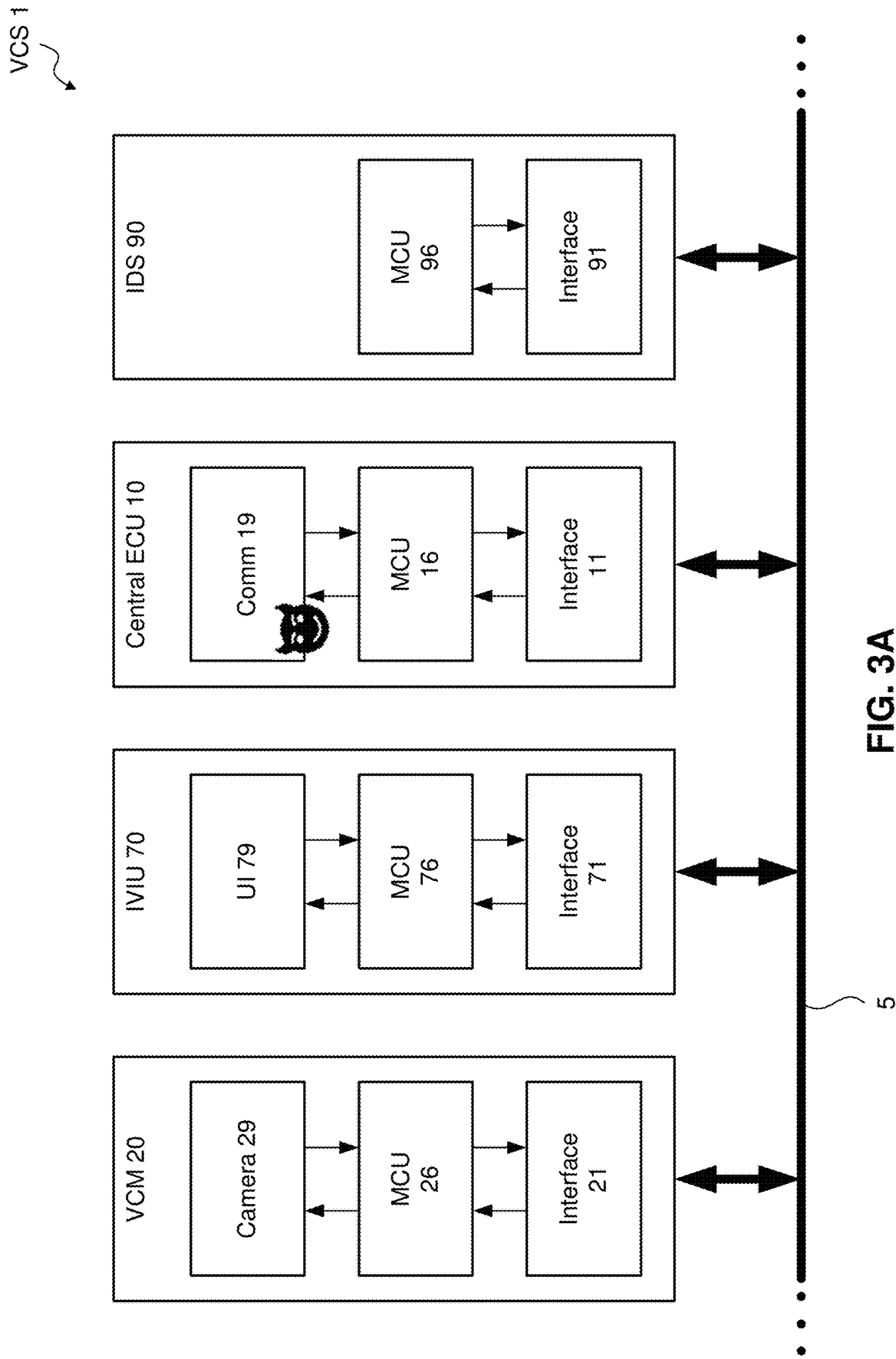
FIG. 3A shows various exemplary electronic control units (ECUs) of a vehicle control system connected to an in-vehicle network, including a single dedicated intrusion detection node according to some aspects of the present disclosure.

FIG. 3A shows an exemplary vehicle control system 1 with various ECUs connected to an in-vehicle network 5, including an ECU 90 serving as a dedicated intrusion detection system (IDS). More specifically, FIG. 3 illustrates a compromised vehicle control system 1 including (among others) a rogue node, e.g., communication interface 19 of the Central ECU 10, alongside authentic nodes, e.g., IVIU 70, VCM 20, and IDS 90. For example, Central ECU 10, may be infected with malware and be under adverse control that causes the communication interface 19 to function maliciously. The rogue node may be used to spread false information in the in-vehicle network 5. The rogue node may be able to perform a masquerading attack (i.e., send messages on behalf of other nodes) or a replay attack. Consequently, by injecting messages with the corresponding falsified message ID (e.g., masquerading messages), the rogue node can cause propagation and consumption of false information in the automated driving/piloting system, affecting safety-critical decision making (e.g., by delaying the FCW—Forward Collision Warning). The rogue node may impersonate an authentic node and transmit messages including false information.

FIG. 3A also illustrates a centralized dedicated intrusion detection system (IDS) unit interfacing the in-vehicle network (IVN) to monitor the message traffic stream. An intrusion detection system detects that a possible intrusion has happened and may block or flag the suspected message. For example, the IDS may inspect (all or selected) traffic in the IVN and provide security classifications for the inspected traffic (e.g., flag each message that seems malicious as malicious and/or flag each message that seems benign as benign) according to a certain policy. The IDS can inspect different traffic properties (timing of messages, frequency of messages, etc.), physical properties (e.g. voltages), message identifiers, payload, etc. to make a decision. For instance, a centralized dedicated IDS coupled to the IVN may inspect the messages in the IVN and output security tags (malicious/benign) corresponding to each inspected message. The security tags may be provided via a secure communication channel between the centralized IDS and another node (e.g., the central ECU 10). The security tags may be provided via the IVN as another message. In some instances, the ECUs coupled to the IVN may receive and quarantine a message until a security tag associated with the message is also received. The ECUs can determine whether to consume (e.g., use the content of) a message based on the security tag associated with the message. In other instances, a centralized dedicated IDS coupled to the IVN may inspect the messages in the IVN and filter out or remove messages deemed to be malicious by the IDS. The ECUs coupled to IVN can expect that the messages in the IVN are sanitized.

Referring to FIG. 3A, IDS 90 may be a dedicated ECU that continually monitors the in-vehicle network 5 of the vehicle control system 1 to detect a masquerading message or a replayed message that is being injected by a malicious node. For example, IDS 90 may include bus interface 91 and MCU 96 including control logic in hardware or software. The IDS control logic may read all or a selected subset of messages from the traffic stream on the in-vehicle network. The IDS control logic may differentiate between messages that are transmitted by authentic nodes and messages that are transmitted by rogue nodes. Consequently, the IDS control logic may detect a malicious message (e.g., masquerading/ replayed message) and mark the malicious message or remove it from the in-vehicle network 5. In some examples, a centralized IDS may be implemented in one of the ECUs, such as the central ECU 10.

Alternatively, the intrusion detection system may be decentralized. For example, an IDS module may be included in each node, in which case, the IDS module of a node may inspect a selected subset of messages from the traffic stream on the IVN. The selected subset of messages may be messages for the respective node or allegedly sourced by the respective node. When a malicious message (e.g., masquerading/replayed message) is detected, the IDS module can block the malicious message from being consumed by the respective node. The detection techniques for a decentralized IDS are the same as or similar to the detection techniques for a centralized IDS. Additionally, the respective node may also detect that a message allegedly sourced by the respective node is a malicious message sourced by a malicious node because the respective node does not recognize the message as one that the respective node has transmitted. When a malicious message is detected at one node, the IDS of the one node can also send a security tag corresponding to the message to indicate to an IDS of another node that the message is malicious. In some instances, when a malicious message is detected at one node, the IDS of the one node may remove the malicious message from the traffic stream.

Figure 3B:
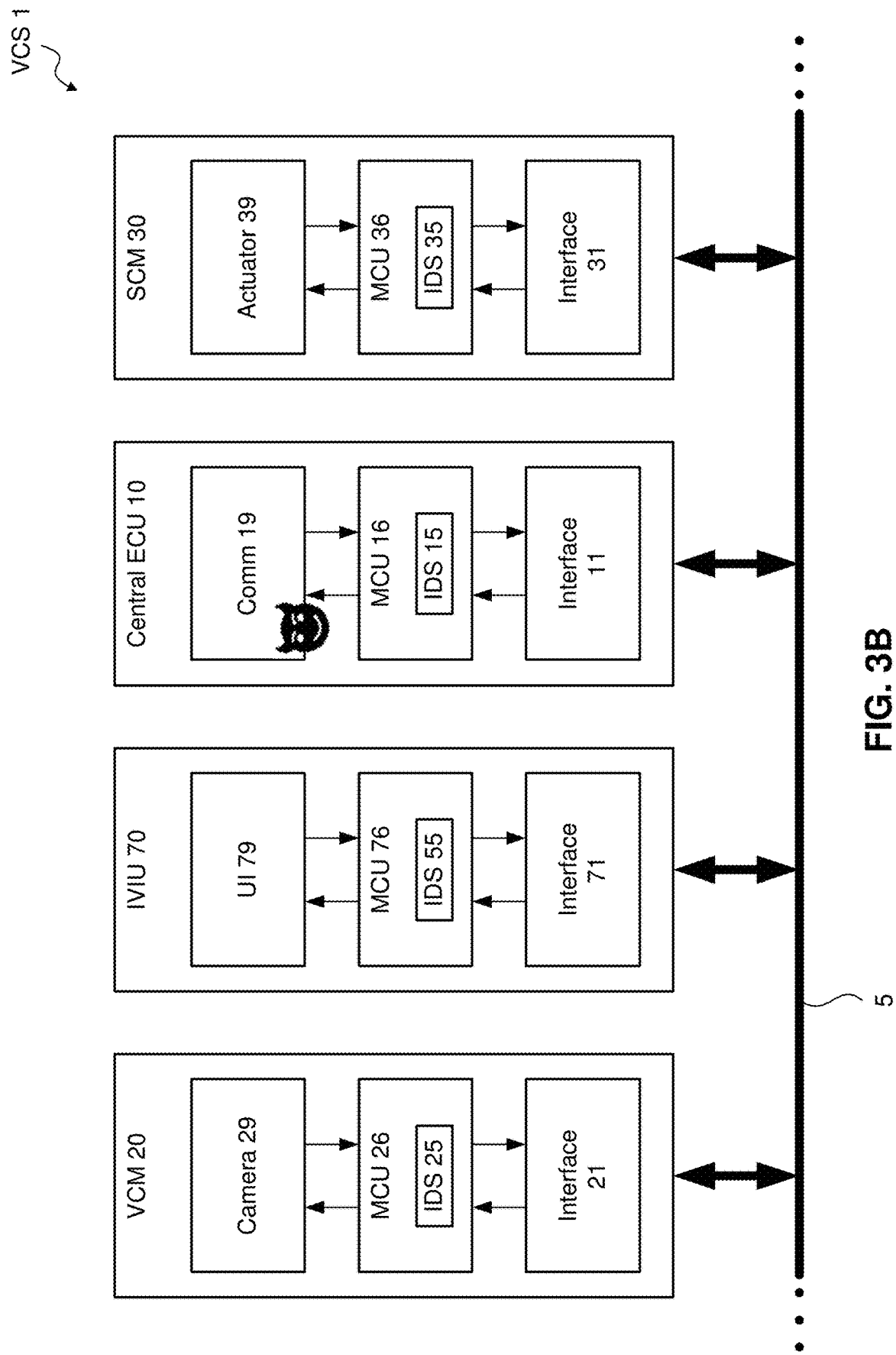
FIG. 3B shows various electronic control units (ECUs) of a vehicle control system connected to an in-vehicle network, where each ECU includes an intrusion detection system (IDS) module according to some aspects of the present disclosure.

For example, FIG. 3B shows an exemplary vehicle control system 1 with various ECUs connected to an in-vehicle network 5, where each node includes an intrusion detection system (IDS) module interfacing the in-vehicle network (IVN) to monitor the message traffic stream. Referring to FIG. 3B, each ECU may include an IDS module that continually monitors the in-vehicle network of the vehicle control system to detect a malicious message (e.g., masquerading/replayed message) that is being injected by a malicious node. For example, central ECU 10 may include an internal bus interface 11, an external communication interface 19 (e.g., Wi-Fi, cellular, or other transceiver), and MCU 16 with IDS 15 including control logic in hardware or software. In a decentralized IDS, for example, the IDS control logic may be firmware implemented in the MCU of each node or the IDS control logic may be a circuit connected to the interface and MCU of each node. The IDS control logic may be implemented as part of the same chip or package as the MCU or as a distinct, stand-alone chip or package, external to the MCU chip or package.

Referring to FIG. 3B, the IDS control logic enables a monitoring node to detect a new message, determine a characteristic of the message (e.g., by extracting or obtaining the message identifier, the message content, the message timing message, and the like), and to determine whether the message is false based on the characteristic. The IDS control logic may inspect all messages or a selected subset of messages on an in-vehicle network (IVN), perform a security or threat assessment of each inspected message, and assign a security or threat classification label (e.g., a security or detection tag indicating a security/threat assessment) to each inspected message. For example, the IDS control logic may classify a message as either benign or malicious (i.e., binary detection tags). The IDS control logic may provide the security classification label (security/detection tag) for each message. That is, the IDS control logic may provide a per-message payload tagging that designates whether the IDS control logic deems the message authentic or inauthentic (e.g., either a benign designation or malicious designation), indicating whether the received message is believed to have arrived from the legitimate transmitting node which is normally expected to send this message or indicating whether the received message is believed to have arrived from a rogue node. Where the IDS control logic is associated with a specific node, the IDS control logic may inspect each message but only perform a security or threat assessment, assign a tag, and output a tag for messages to be received by the specific node. The IDS control logic may be implemented with various intrusion detection techniques, including, e.g., ECU voltage fingerprinting, Message Time Series IDS, Control Loop IDS, etc.

In exemplary aspects, a safety model (e.g. a behavioral safety model, trajectory model, and/or Dynamic Driving Task safety model), such as a Responsibility-Sensitive Safety (RSS) model, leverages the intrusion detection system (IDS) to perform verifications against one or more types of signals, such as speed. However, the IDS according to the present disclosure is not limited to particular signal types and the aspects are applicable to systems and methods directed to detecting intrusions that exploit other signals that the RSS relies on, such as vehicle position.

Exemplary aspects of the disclosure include methods to detect attacks on automated vehicle systems considering a more expansive operational capabilities of the autonomous system (e.g. a more expansive "attack surface"). In particular, the systems and methods according exemplary aspects provide a robust detection of continuous attacks across the complete AV system attack surface (e.g. from perception to actuation). In one or more aspects, the model of the automated driving system is a function of perception and actuation, and the autonomous system monitors its execution towards a defined plan (behavior) by measuring deviation between its nominal reach set and the current set.

One or more aspects may incorporate modeled system uncertainty in the vehicles perception and actuation subsystems. The uncertainty may be estimated using a cost function that bounds execution performance to determine the presence of a continuous malicious attack. Advantageously, once the intrusion(s) has been detected, the IDS according to exemplary aspects may mitigate the attack by containing performance to the by-design-allowed system uncertainty, which renders the attack useless. The IDS may also provide a notification of an occurrence of an attack.

In an exemplary aspect, and as described in more detail below, by applying a learned system uncertainty under normal AV operation, the sensitivity of the attack detection is continuously adapted into the system (e.g. score (A)≤score (U)). A reachable set (e.g. group of possible states to which the module can arrive in the specified time window) may be calculated for a subset of systems known to be more vulnerable to attacks or to the complete AV systems providing customizable computational monitoring efforts. Advantageously, the aspects of the disclosure are independent from the Automated System configuration, and aspects may be applied to any Perception and Actuation pipeline configuration providing redundancy for the intended system functionality.

Under a human driver, external malicious attacks generally centered on disabling the human control of the vehicle (e.g. steering/gas/break). In these situations, the attack area/surface is restricted to disabling of the actuation components. With the introduction of more advanced driving automation features as vehicles progress in the levels of automation towards fully automated, the "attack surface" increases to more aspects of the automated systems. For example, an adversary in control of an ECU may be able to perform masquerading attacks (sending messages on behalf of other ECUs) by injecting messages with the corresponding target message identifier (MID) which causes propagation and consumption of false information into the ADAS or AV system. This can affect safety-critical decision making by delaying functionality such as object detection, warnings, or planning modules.

Figure 4:
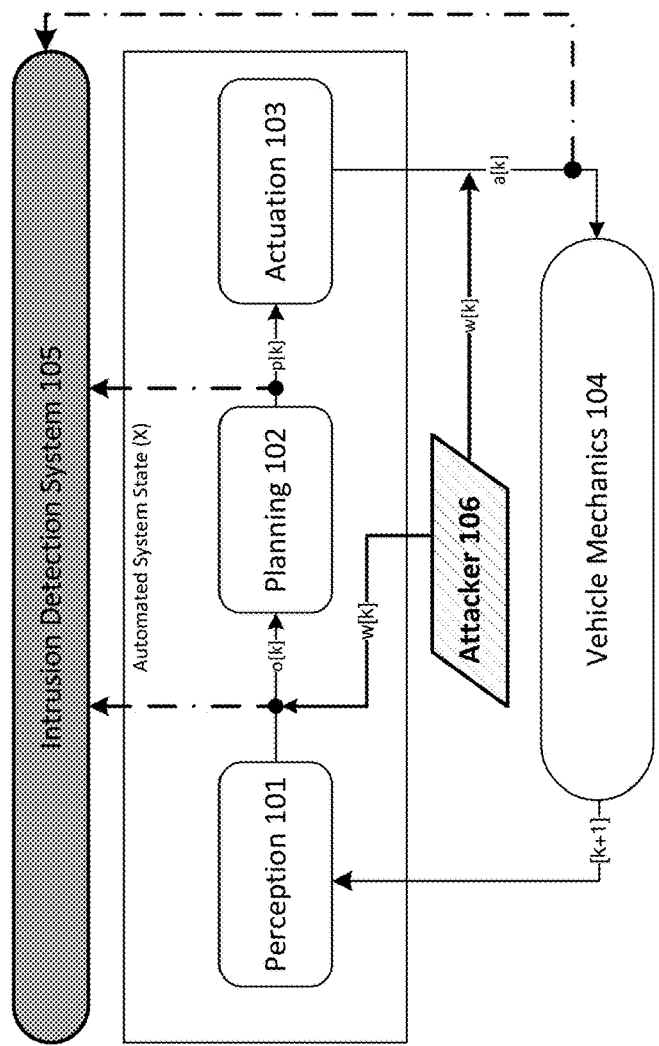
FIG. 4 shows a vehicle control system according to various aspects of the present disclosure.
Figure 4:
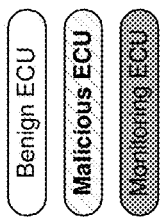

As illustrated in FIG. 4, the VCS 1 according to an exemplary aspect, the IDS 105 samples signals the CAN. The vehicle automation can be defined as a function of perception and actuation in the traditional perception-planning-actuation paradigm. In an exemplary aspect, the automated system state is defined at time k as $x_k$ being a function of perception (o[k]) and actuation (a[k]) so that $x_{k+1} = f(o_k, a_k)$. In this illustrated example, an attacker 106 targets the actuation and/or perception channels by injecting noise or a malicious message ($w_k$) into these channels thereby producing a perception attack ($o_k + w_k$) or an actuation attack ($a_k + w_k$). As described above, the attacker 106 can be a malicious ECU of the AVS 1. The perception module 101 may correspond to one or more ECUs directed to capture the perceived environment of the AV, such as the VCM 20, sensor module 50, GPS module 80, or the like. The planning module 102 may correspond to one or more ECUs directed to controlling the AV, such the central ECU 10. The actuation module 103 may correspond to one or more ECUs directed to actuating the mechanics of the vehicle (e.g. steering, braking, transmission, or engine), such as the steering control module 30, transmission control module 40, and brake control module 60.

Figure 5:
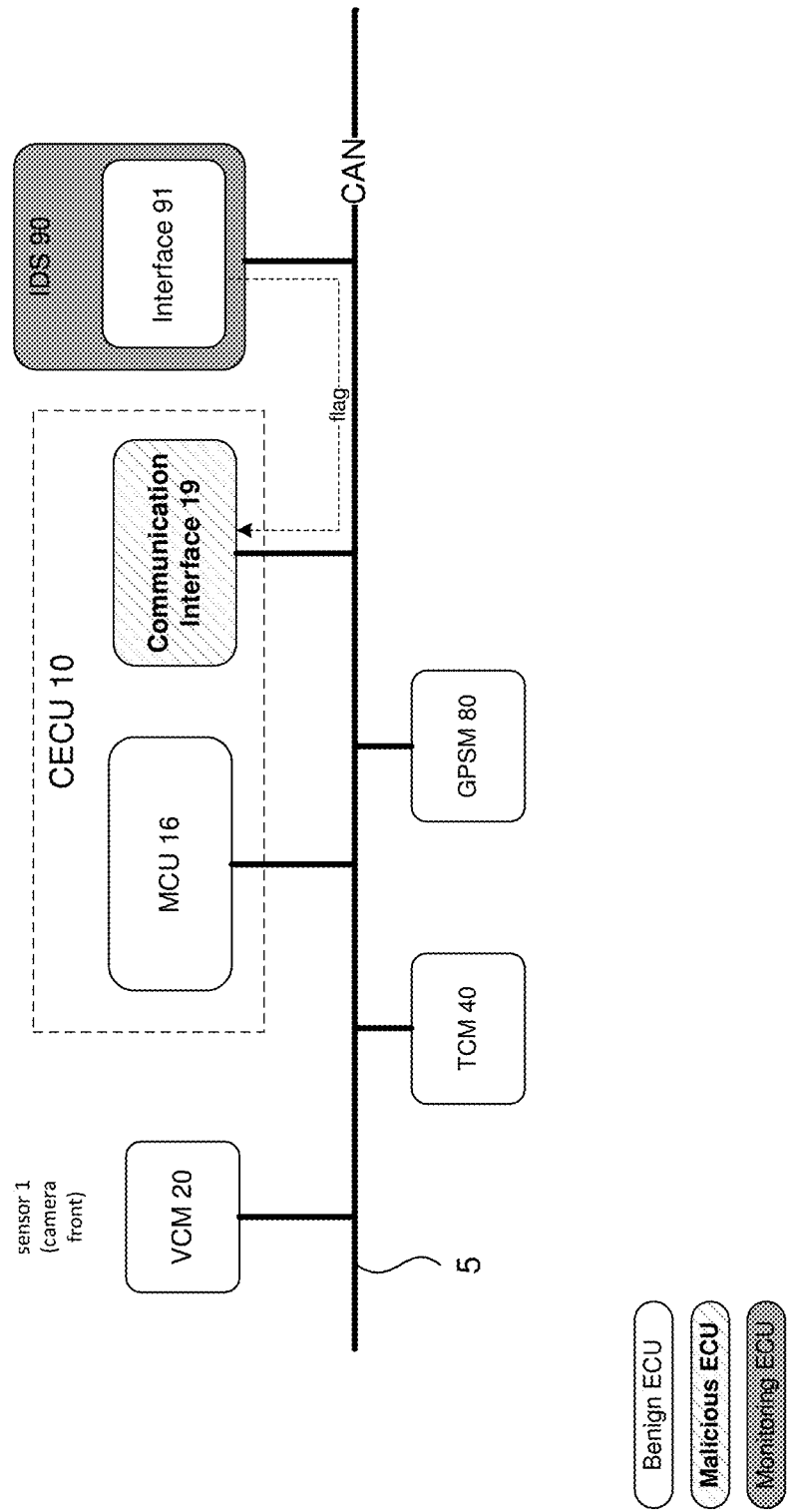
FIG. 5 shows a vehicle control system according to various aspects of the present disclosure.

FIG. 5 shows an exemplary vehicle control system 1 with various ECUs connected to an in-vehicle network 5, including an ECU 90 serving as a dedicated intrusion detection system (IDS). More specifically, FIG. 5 illustrates a compromised vehicle control system 1 including (among others) a rogue node, e.g., communication interface 19 of the Central ECU 10, alongside authentic nodes, e.g., VCM 20, TCM 40, GPSM 80. For example, Central ECU 10, may be infected with malware and be under adverse control that causes the communication interface 19 to function maliciously. In operation, the malicious ECU 10 may attempt to impersonate benign ECUs (e.g. VCM 20, SM 50, GPSM 80) to impact the CECU's 10 ability to plan the navigational routes of the vehicle. In the illustrated example, the communication interface 19 is operating as a rogue/malicious module of the VCS 1, which may comprise received and/or transmitted data via the communication interface 19. In an exemplary aspect, the IDS 90 interfacing the in-vehicle network 5 through the interface 91 is configured to detect and flag one or more messages from the malicious CECU 10 (communication interface 19). The flagged messages may then be isolated and filtered from the WN 5. In other aspects, the other ECUs or components of the VCS 1 can be configured to ignore the messages flagged by the IDS 90 that may have been received by these other ECUs or components.

Figure 6:
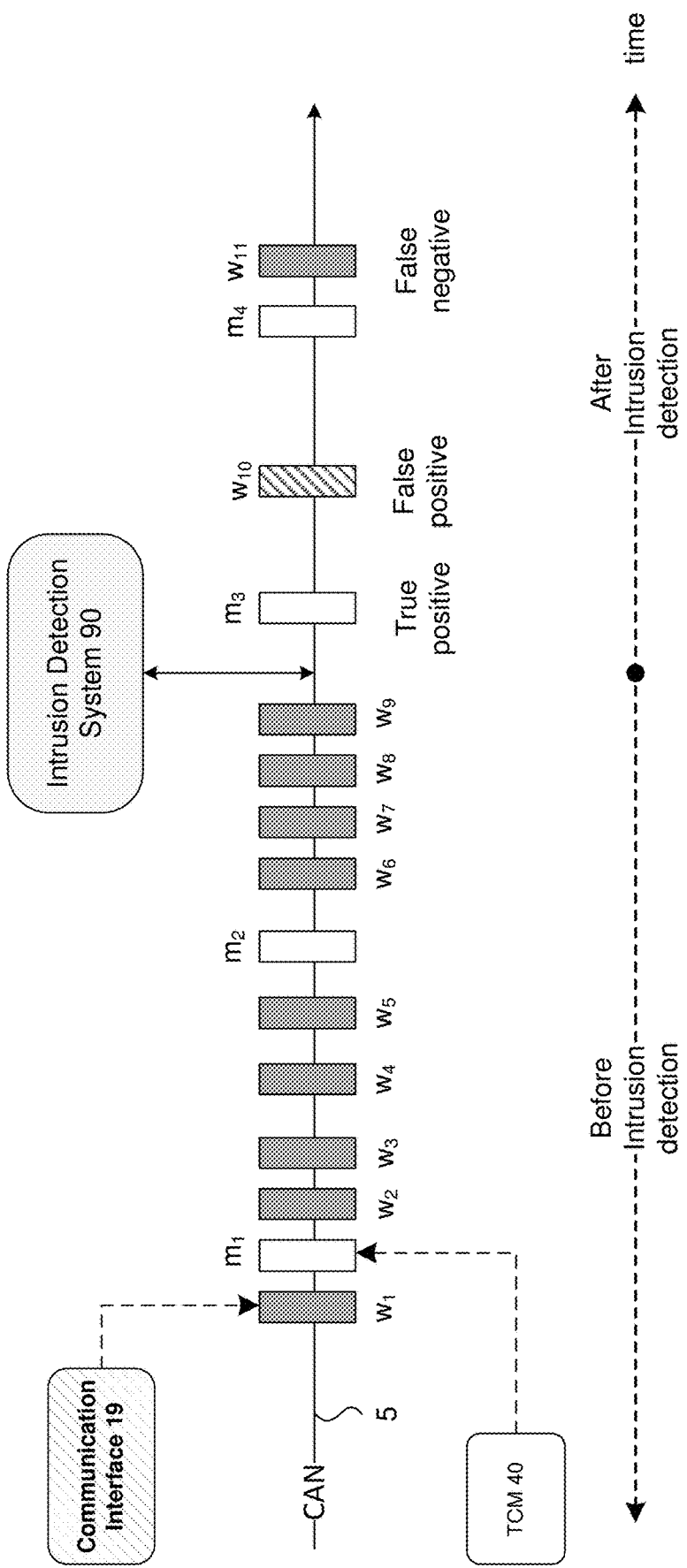
FIG. 6 shows a vehicle control system according to various aspects of the present disclosure.

In a possible malicious attack, an attacker (malicious ECU) may flood the IVN 5 with noise, duplicative messages, or other malicious messages to exploit a false negative rate of the IDS 90. An example of a high-frequency message attack is illustrated in FIG. 6. In this example of a high-frequency attack, the TCM 40 transmits messages ($m_1$, $m_2$, $m_3$, $m_4$) on the IVN 5 while the malicious ECU (CECU 10/communication interface 19) floods the IVN 5 with malicious messages/noise (($w_1$, $w_2$, ... $w_{11}$). The IDS 90 is configured to detect and filter out the malicious messages/noise from the IVN 5. Although one or more false positives ($w_{10}$) or a false negatives ($w_{11}$) may result from the detection and filtering, the IDS 90 advantageously reduces and/or eliminates the impact of the high-frequency attack.

In an exemplary aspect, and as described in more detail below, the IDS is configured to determine a false negative rate based on a comparison of reachable set to a nominal set to further combat a malicious attack such as the high-frequency attack illustrated in FIG. 6.

Figure 7:
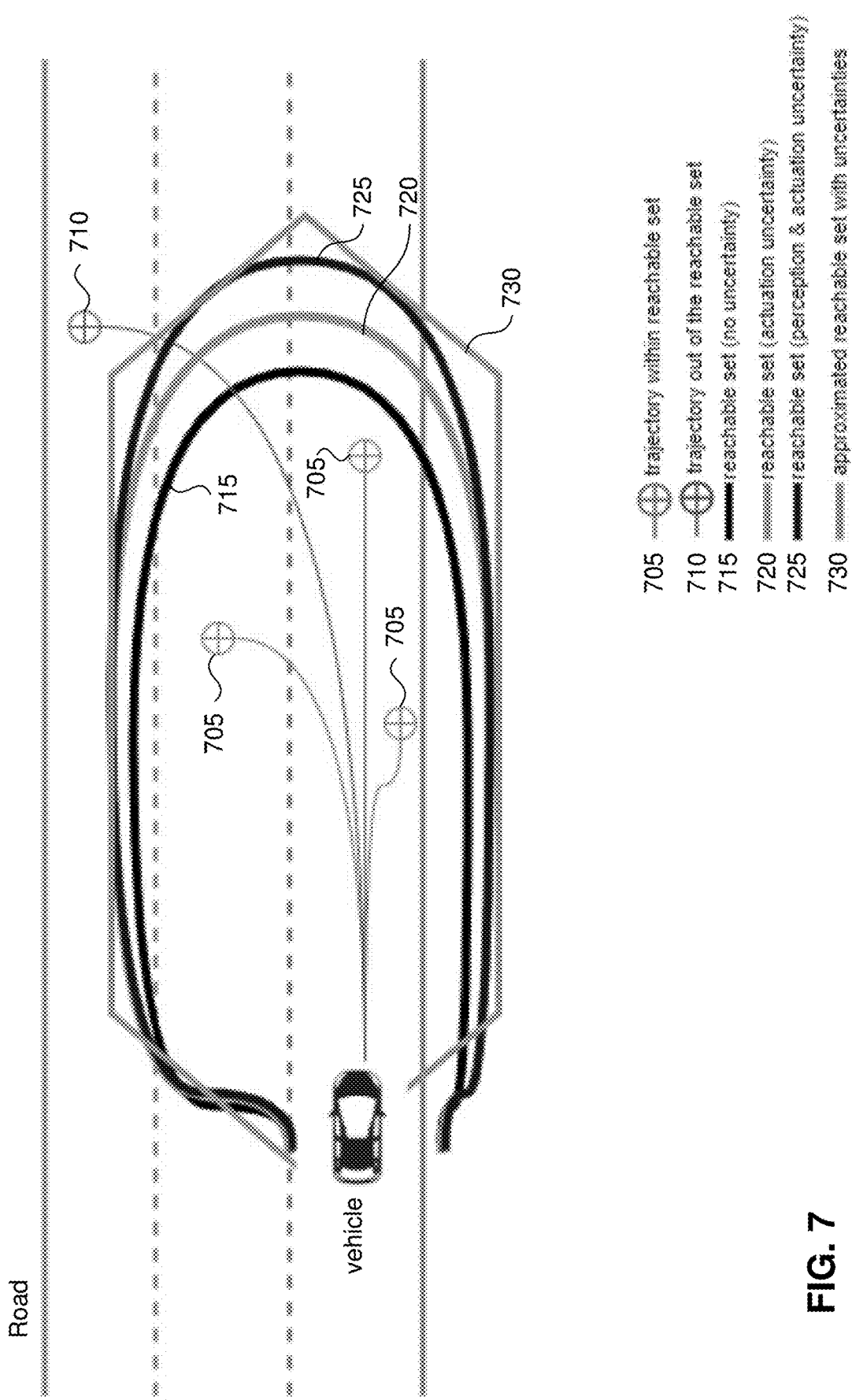
FIG. 7 shows trajectories with respect to various reachable sets according to various aspects of the present disclosure.

With reference to FIG. 7, trajectories of a vehicle are illustrated with respect to various reachable set conditions. In an exemplary aspect, the VCS 1 (e.g. CECU 10) is configured to calculate one or more sets of trajectories and final positions to which the vehicle can arrive in a specified time window under the specified perception, planning and actuation constraints. The sets of trajectories is referred to as a "reachable set." As the level of uncertainty increases, the reachable set increases. For example, as illustrated, the vehicle has a reachable set 715 (black) with no uncertainty, a reachable set 720 (orange) including actuation uncertainty, reachable set 725 (blue) including perception and actuation uncertainties, and reachable set 730 (green) is an approximate (e.g. worst case) reachable set including uncertainties. The trajectories 705 (blue) correspond to trajectories that fall within the reachable set 715 including no uncertainties, while trajectory 710 (red) is a trajectory that falls outside of the nominal reachable set 715.

Figure 8:
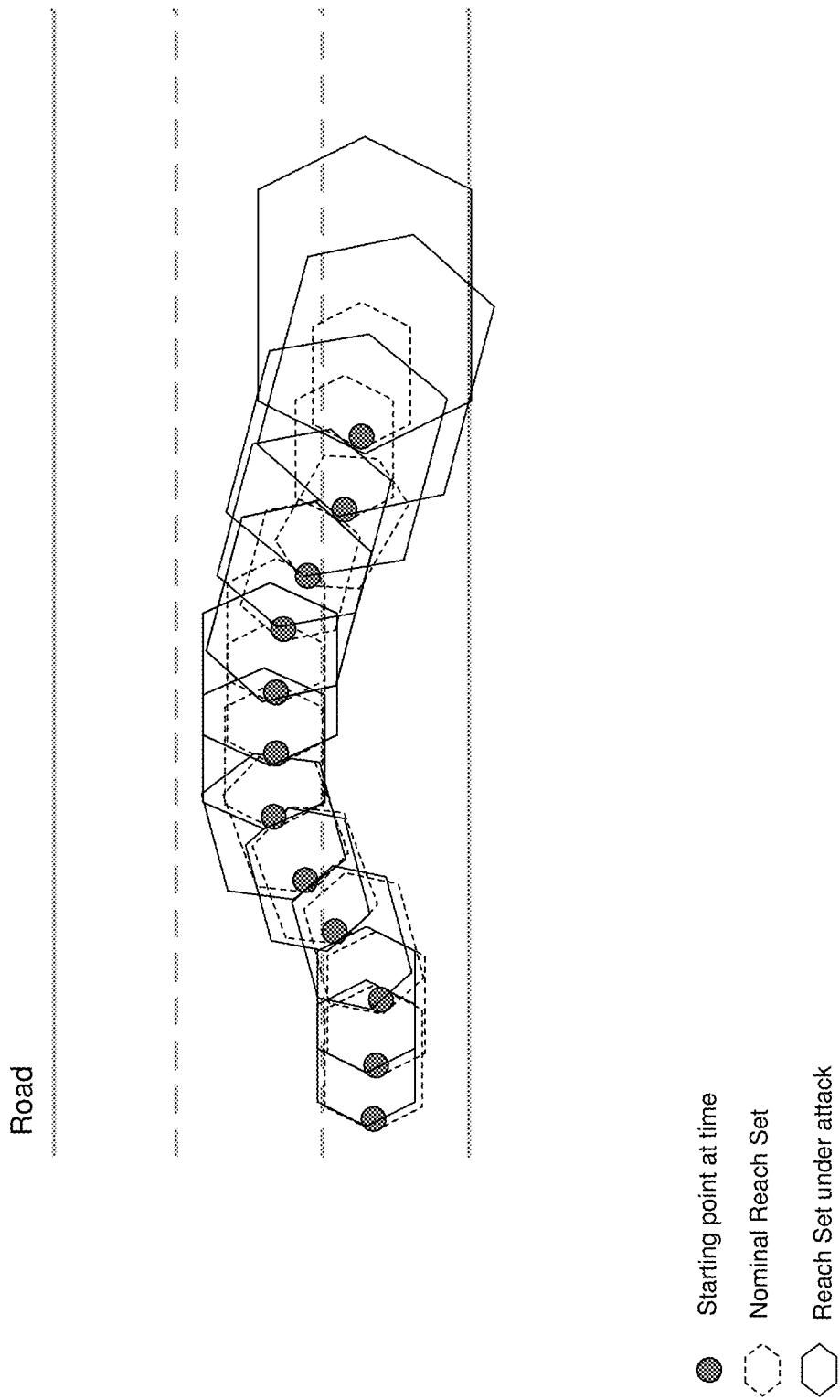
FIG. 8 shows reachable sets over time according to various aspects of the present disclosure.

When an attack is present, the reachable set might change over time, for the duration of the attack. The objective of the attacker is to make likely trajectories that would normally be un-reachable (i.e. dangerous). That is, the more the reachable set under attack deviates from the nominal set, the more effective the attack. This is illustrated in FIG. 8 that shows the starting point of the vehicle at various points in time. As the time passes, the reachable set under attack changes and the attack increases the reachable set as compared to the nominal set.

In an exemplary aspect, the IDS is configured to score an attack's impact on the reachable set. The IDS may score current, future, and/or past attacks. The IDS may implement machine learning to adaptively improve the scoring of attacking in one or more aspects.

Figure 9:
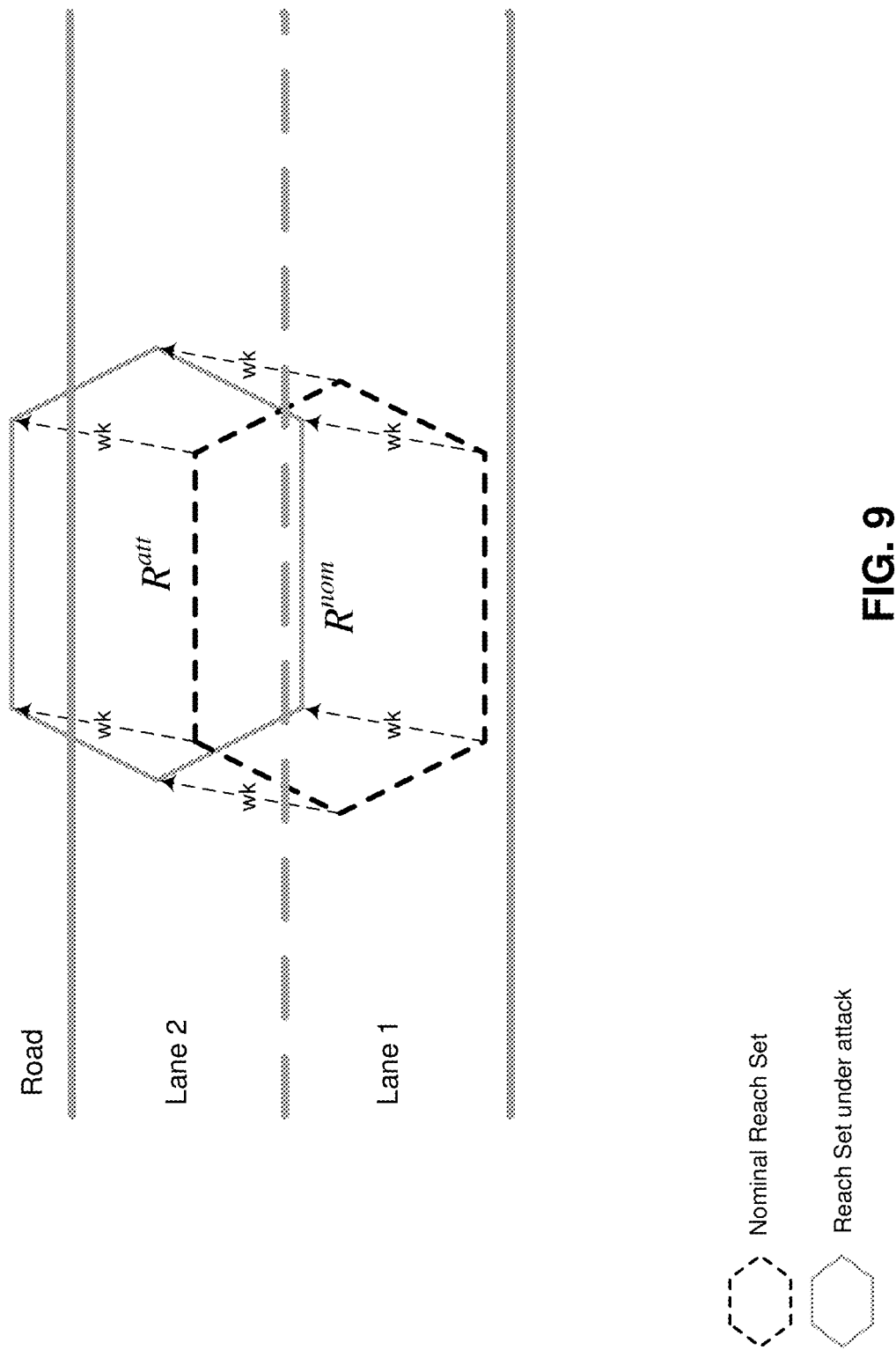
FIG. 9 shows a comparison of nominal and attack reach sets according to various aspects of the present disclosure.

In an exemplary aspect, the attacker could execute, for example, perception attacks and/or actuation attacks. In an exemplary aspect, perception attacks can be illustrated by the following equation:

$$x_k^a = x_k + w_k$$

where $x_k^a$ represents the attacked state, $x_k$ is the nominal state, and $w_k$ is the effect of the attack on the state. As illustrated in FIG. 9, the effect on the reachable set is a translation in the direction of the $w_k$ vector. Individual attacks on actuation, or as combination of both perception and actuation, may cause similar translation effects.

In an exemplary aspect, the IDS is configured to measure or score success of an attack (independently of the nature of the attack in the system) in the area of the reachable set under attack ($R^{att}$) that lies outside the nominal set ($R^{nom}$) as illustrated in FIG. 9. The goal of an attack is to minimize the intersection of the nominal and the attacker sets. The smaller the intersection, the larger the attack score A. In an exemplary aspect, an attack score A is calculated based on the following equation:

$$score(A) = \Sigma_k vol(R_k^{att}) - vol(R_k^{att} \cap R_k^{nom})$$

where $R^{att}$ is the reachable set under attack and $R^{nom}$ nominal reachable set.

In an exemplary aspect, it can be assumed that the attacker wk is limited by some energy bound H that constrains the impact it can have at a particular period of time. For example, the attacker may not be able to provide fake sensing information at a higher frequency than the vehicle's perception system. Similarly, actuation is also limited by vehicle dynamics (e.g. Kamms friction circle theory) and both perception and actuation sensors perform with uncertainty M[k].

In an exemplary aspect, the VCS (e.g. IDS) is configured to determine system uncertainties that can include perceptual uncertainties and actuation uncertainties.

Perceptual Uncertainty

Errors in the measurements of sensors and perception-based processes such as estimations of position and size of objects on the road can be caused by internal conditions (e.g. sensor error) or external conditions (e.g. impact of weather, lighting conditions).

Internal conditions may be known based on manufacturing requirements/procedures and evaluations during system integration. The errors associated with internal conditions may be provided to IDS as a static error estimate.

For estimating errors associated with external conditions, in an exemplary aspect, the perception pipeline may use Bayesian Neural Networks (BNNs) where network parameters are represented by probability distributions. During inference, these types of perception modules generate a predictive distribution over the outputs with multiple metrics (predictive mean, entropy).

In an alternative or additional aspect, the perception uncertainty of one or more individual sensors can be determined using a neural network and a trained probability estimator. The perception module can be set as Software-in-the-Loop with simulation tools that produce virtual renderings of the particular input, and/or the perception module can use ground-truth estimates from the virtual world or from real world data by using a set of other redundant sensors to calculate the perception uncertainty distribution of one.

In an exemplary aspect, the VCS (e.g. IDS) can include an automotive perception module configured for probabilistic perception. The perception module can be configured to perform object detection that produces bounding box observation vectors $o^i$ per object in $\mathbb{R}^9$ such that $o_k^i = \{(c_x, c_y, c_z), (d_x, d_y, d_z), (\theta, \phi, \alpha)\}$, (respectively center, dimension, and orientation values of the object). Besides the observation vector, the probabilistic perception module produces an uncertainty metric as normal distribution $M_k$ and optionally the sensor error (although this is usually embedded in the other variables).

Actuation Uncertainty

Actuation uncertainty for automated systems are generally limited as the vehicle needs to undergo extensive automotive certification on the driveline components to certificate the tolerance of wheels and transmission modules to, for example, prolonged vibration. However, other real-world conditions may impact the actuation uncertainty of the system, such as environmental and/or operational conditions that may cause the actuation performance to fluctuate. In an exemplary aspect, deviations may be modelled using one or more conventional formal and/or probabilistic methods, such as a driveline and rear axle coupled torsional vibration model (DRCTVM), a Monte Carlo process, a multi-island genetic algorithm, or the like.

Additionally or alternatively, deviations may be learned using an actuation uncertainty network trained during the vehicle's daily operation by receiving, as input, the actuation commands and optionally environmental conditions, and, as training signal, the measurement of the actuation forces. The VCS (e.g. IDS) may be configured to produce a probability range of the actuation forces for the given actuation command.

In an exemplary aspect, the actuation response function may be systematically tested and collected as a sample of a non-stationary distribution. For example, the VCS (or more specifically, a perception system of the vehicle) can create a map of the expected response of actions in actor to the sensor inputs. For example, if the vehicle detects a bumper at certain velocity, it is possible to sample the damper/suspension of the system by integrating the visual odometry from multiple viewpoints. Another example is the breaking response function at diverse speeds being coupled with the ego-motion tracking from multiple sensors. Using a sliding time-window over the collected samples, it is possible to infer the non-stationary probabilistic density function of the combined response of the actuator sub-systems. In an exemplary aspect, the process can be done via Kernel Density Estimation, but is not limited thereto.

In an exemplary aspect, the IDS is configured to calculate, using the known automated system uncertainty metric $M_k$ (perception and actuation) learned from normal vehicle operation, as described herein, an extended reachable set and provide an uncertainty score U. In an exemplary aspect, the uncertainty score U is determined based on the following equation:

$$\text{score}(U) = \Sigma_k \text{vol}(R_k^{unc}) - \text{vol}(R_k^{unc} \cap R_k^{nom})$$

where $R_k^{unc}$ is the uncertainty/extended reachable set under attack and $R_k^{nom}$ is the nominal reachable set. In this example, the reachable/reach set is "extended" due to uncertainties in the VCS compared to the nominal reachable/reach set.

With the uncertainty score U, the maximum allowed perturbation of the reachable set caused by the known system uncertainties is bounded. In an exemplary aspect, the IDS is configured to use the uncertainty score U to filter actuation/perception messages. For example, the IDS can filter actuation/perception messages that exceed the uncertainty score U. This guarantees that score (A)≤score (U). By ensuring that the score (A)≤score (U), the IDS can be configured to determine that the only possible attacks are those that do not outperform the uncertainty energy threshold (uncertainty metric $M_k$). With this constraint, the CECU and the planning of the vehicle thereby perform safe planning under these uncertain conditions. Advantageously, the impact of attacks that may be labeled as innocuous are consequently restricts because their effect will not be different than the system's own noise.

Figure 10A:
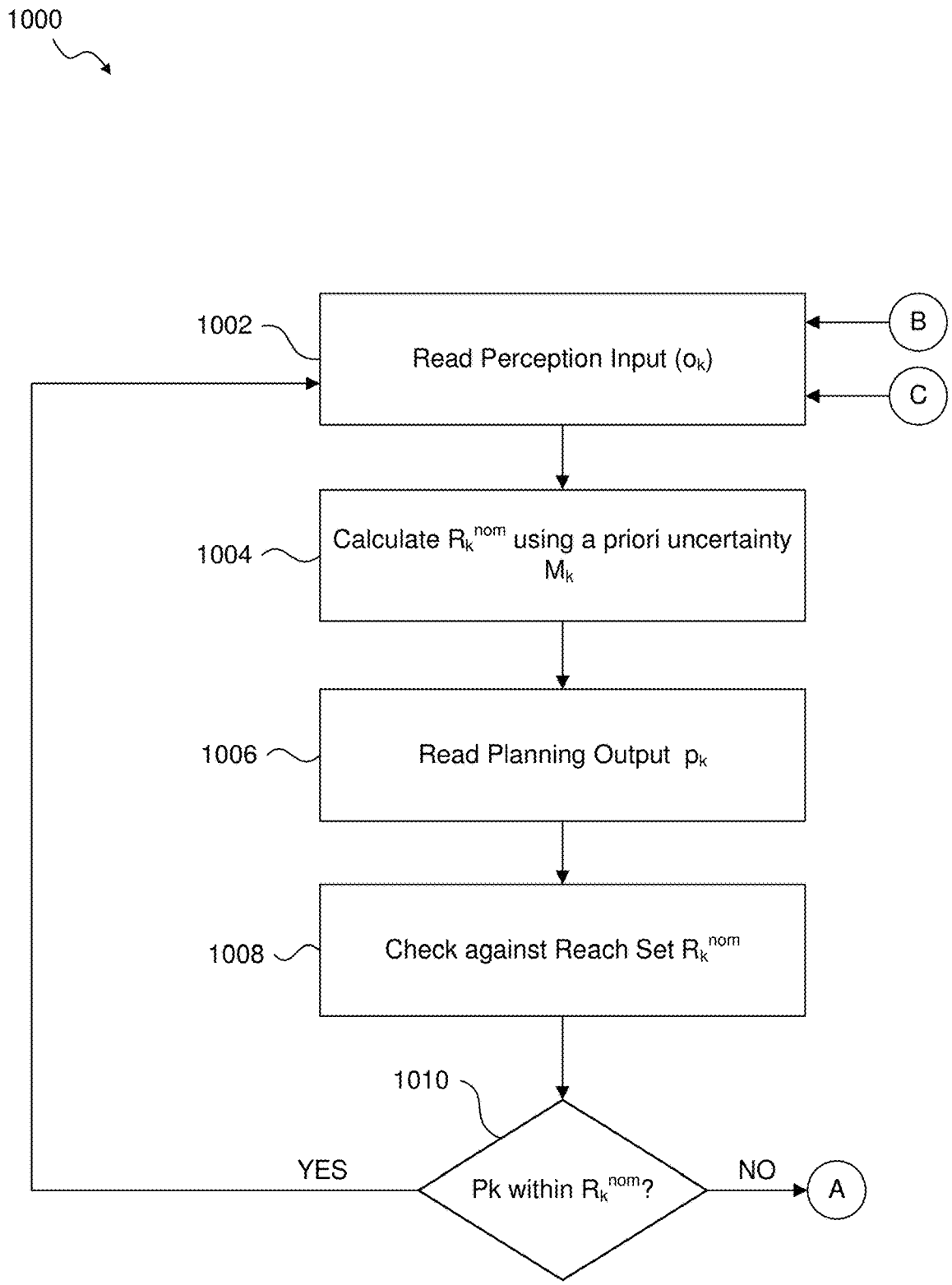
FIGS. 10A-10B illustrate a flowchart of an intrusion detection method according aspects of the disclosure.
Figure 10B:
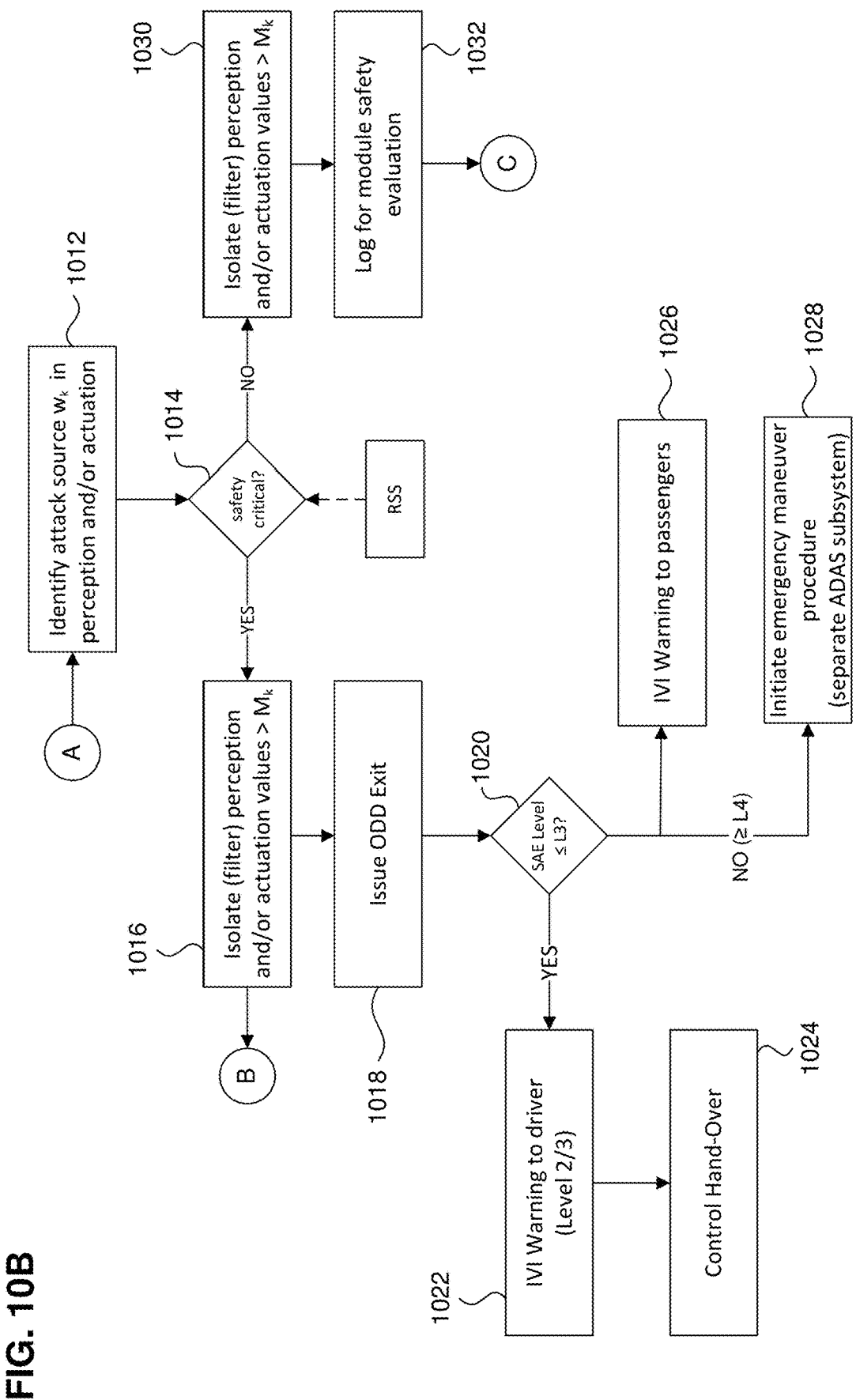

FIGS. 10A and 10B illustrate an intrusion detection method 1000 according to an exemplary aspect of the present disclosure. The flowchart 1000 is described with continued reference to FIGS. 1-9. The operations of the method are not limited to the order described below, and the various operations may be performed in a different order. Further, two or more operations of the methods may be performed simultaneously with each other.

The flowchart 1000 begins with operation 1002, where perception input ($o_k$) is read. For example, the IDS (as a central node or each distributed node) may monitor an in-vehicle network for a message in a message stream on the in-vehicle network.

After operation 1002 the flowchart 1000 transitions to operation 1004, where nominal reachable set $R_k^{nom}$ is calculated using a priori uncertainty metrics $M_k$. For example, the IDS may calculate the nominal reachable set $R_k^{nom}$ based on the known automated system uncertainty metric $M_k$ (perception and actuation), which is learned from normal vehicle operation.

After operation 1004 the flowchart 1000 transitions to operation 1006, where the planning output $p_k$ is determined/read. For example, the IDS may receive, via the in-vehicle network, the planning output $p_k$ from the CECU or other ECU of the VCS.

After operation 1006 the flowchart 1000 transitions to operation 1008, where the planning output $p_k$ is checked against nominal reachable set $R_k^{nom}$. For example, the IDS can determine if one or more trajectories of the planning output $p_k$ extend outside of the nominal reachable set $R_k^{nom}$. In an exemplary aspect, it is checked if the trajectory at each time k extends outside of the nominal reachable set $R_k^{nom}$ given the initial conditions for the vehicle and the a-priori known uncertainty distributions. In an exemplary aspect, the operation 1008 includes the checking if score (A)≤score (U). In this example, the uncertainty/extended reachable set under attack ($R_k^{unc}$) can be used to determine score (U). In an exemplary aspect, the score (U) is calculated based on the following equation:

$$\text{score}(U) = \Sigma_k \text{vol}(R_k^{unc}) - \text{vol}(R_k^{unc} \cap R_k^{nom})$$

where $R_k^{unc}$ is the uncertainty/extended reachable set under attack and $R_k^{nom}$ is the nominal reachable set. In this example, the reachable/reach set is "extended" due to uncertainties in the VCS compared to the nominal reachable/reach set.

After operation 1008 the flowchart 1000 transitions to operation 1010, where the process flow arrives at decision block 1010 corresponding to the checking operation 1008.

If it is determined that the one or more trajectories of the planning output $p_k$ are within the nominal reachable set $R_k^{nom}$ the flowchart 1000 returns to operation 1002 and the flowchart can be repeated.

If it is determined that the one or more trajectories of the planning output $p_k$ extend outside the nominal reachable set $R_k^{nom}$, the flowchart 1000 transitions to operation 1012.

At operation 1012, the attack source $w_k$ is identified in the perception and/or actuation associated ECUs to isolate the one or more ECUs that are performing one or more malicious functions/operations. In an exemplary aspect, the attack source $w_k$ is identified as part of the process of identifying an attack (e.g. comparing score A<score U of Operation 1008). In an exemplary aspect, the attack source $w_k$ is identified by a subsequent comparison of input signals to determine where uncertainty is beyond the normal uncertainty distribution. In an exemplary aspect, the system may black-list one or more ECUs determined to be associated with the attack and/or trigger a fail-safe mechanism. For example, the IDS may detect a malicious message (e.g., masquerading/replayed message) and mark the malicious message or remove it from the in-vehicle network 5 as described with reference to FIGS. 3A-3B.

After operation 1012, the flowchart 1000 transitions to operation 1014, where it is checked whether the trajectory that extends outside the nominal reachable set $R_k^{nom}$ is safety critical. In an exemplary aspect, the determination of whether the trajectory that extends outside the nominal reachable set $R_k^{nom}$ is safety critical is determined by a trajectory safety module, using one or more safety models (e.g. a behavioral safety model, trajectory model, and/or Dynamic Driving Task safety model), such as a Responsibility-Sensitive Safety (RSS) model. In an exemplary aspect, the IDS is configured to determine the criticality. In an exemplary aspect, the determination of the safety criticality can be determined by: checking if the trajectory falls out of the reachable set (e.g. extended reachable set), which can function as a first criticality indication, and/or checking against a formal safety model that takes kinematics and behavioral assumptions into consideration (e.g. RSS), which can function as a second criticality indication. In this example, if the safety model dictates an unsafe state, the system can identify a safety critical mode. In an exemplary aspect, if the safety model dictates an unsafe state, a critical determination can be made regardless of the determination regarding the reachable set.

If it is determined that the attack results in a safety critical operation, the flowchart 1000 transitions to operation 1016 and the perception and/or actuation values >$M_k$ are isolated/filtered. After operation 1016, the flowchart returns to operation 1002 and also transitions to operation 1018. At operation 1018, an Operational Design Domain (ODD) exit is initiated.

After operation 1018, the flowchart 1000 transitions to operation 1020, where the SAE level is determined. If it determined that the SAE level of the VCS is less than or equal to SAE Level 3, the flowchart 1000 transitions to operation 1022, where a warning message/notification is sent to the driver (and/or vehicle occupants) via the in-vehicle infotainment system. The flowchart then transitions to operation 1024 where the vehicle control is handed over to the driver (e.g. automation is reduced/terminated). The warning message/notification and the hand over may be performed sequentially or simultaneously.

If it determined that the SAE level of the VCS is greater than or equal to SAE Level 4, a warning message/notification is sent to the driver (and/or vehicle occupants) via the in-vehicle infotainment system (at operation 1026) and an emergency maneuver procedure is initiated (at operation 1028) (e.g. via an advanced driving assistance system (ADAS)). As illustrated, the operations 1026 and 1028 are performed simultaneously. However, these operations may be performed sequentially in one or more aspects.

If it is determined that the attack are not safety critical at operation 1014, the flowchart 1000 transitions to operation 1030, where the perception and/or actuation values >$M_k$ are isolated/filtered. After operation 1030, the filtering result (e.g. the filtered actuation values and/or the values remaining after filtering) are logged for module safety evaluations at operation 1032. After operation 1032, the flowchart returns to operation 1002.

EXAMPLES

The following examples pertain to further aspects.

Example 1 is a vehicle control system (VCS) for a vehicle, the VCS comprising: an in-vehicle bus; and an intrusion detection system (IDS) configured to: calculate a planned output of the vehicle based on a message of a message stream received from at least one electronic control unit (ECU) coupled to the in-vehicle bus; calculate a reachable set based on an uncertainty metric; and identify an intrusion of the VCS based on a comparison of the planned output and the reachable set.

Example 2 is the VCS of Example 1, wherein the comparison of the planned output and the reachable set comprises determining if the planned output exceeds the reachable set.

Example 3 is the VCS of any of Examples 1-2, wherein the planned output includes one or more trajectories of the vehicle.

Example 4 is the VCS of Example 3, wherein the IDS is configured to identify the intrusion if the one or more trajectories extends outside of the reachable set.

Example 5 is the VCS of any of Examples 1-4, wherein the IDS is further configured to determine a source of the intrusion in response to identifying the intrusion.

Example 6 is the VCS of any of Examples 1-5, wherein the IDS is further configured to determine a criticality of the intrusion in response to identifying the intrusion.

Example 7 is the VCS of Example 6, wherein the criticality of the intrusion is determined based on a safety model.

Example 8 is the VCS of any of Examples 1-7, wherein the IDS is further configured to filter out one or more perception values or one or more actuation values from the message stream.

Example 9 is the VCS of any of Examples 1-8, wherein the IDS is further configured to, based on a determined criticality of the intrusion: control the VCS to perform an emergency maneuver; or cause a handover of control of the vehicle to a driver.

Example 10 is the VCS of Example 9, wherein the IDS is further configured to determine the criticality of the intrusion based on a safety model.

Example 11 is the VCS of any of Examples 1-10, wherein the message is perception data from at least one of the one more ECUs.

Example 12 is the VCS of any of Examples 1-11, wherein the uncertainty metric is a-priori uncertainty information corresponding to one or more of the at least one ECUs.

Example 13 is the VCS of any of Examples 1-12, wherein the IDS is implemented in another ECU coupled to the in-vehicle bus.

Example 14 is the VCS of any of Examples 1-12, further comprising a plurality of ECUs, wherein the IDS is implemented in a distributed configuration in at least two of the plurality of ECUs.

Example 15 is at least one non-transitory computer-readable medium including a set of instructions that, in response to being executed at an electronic control unit (ECU) among a plurality of ECUs connected to an in-vehicle bus of a vehicle control system (VCS), cause the respective ECU to: calculate a planned output of a vehicle based on a message of a message stream received from at least one of the plurality of ECU via the in-vehicle bus; calculate a reachable set based on an uncertainty metric; and identify an intrusion of the VCS based on a comparison of the planned output and the reachable set.

Example 16 is the medium of Example 15, wherein the comparison of the planned output and the reachable set comprises determining if the planned output exceeds the reachable set.

Example 17 is the medium of any of Examples 15-16, wherein the planned output includes one or more trajectories of the vehicle.

Example 18 is the medium of Example 17, wherein the intrusion is identified if the one or more trajectories extends outside of the reachable set.

Example 19 is the medium of any of Examples 15-18, further comprising determining a source of the intrusion in response to identifying the intrusion.

Example 20 is the medium of any of Examples 15-19, further comprising determining a criticality of the intrusion in response to identifying the intrusion.

Example 21 is the medium of any of Examples 15-20, wherein the uncertainty metric is a-priori uncertainty information corresponding to one or more of the at least one ECUs.

Example 22 is an intrusion detection method of a control system of a vehicle, the method comprising: calculating a planned output of the vehicle based on a message of a message stream received from at least one electronic control unit (ECU) coupled to an in-vehicle bus; calculating a reachable set based on an uncertainty metric; and comparing the planned output and the reachable set to identify an intrusion of the control system.

Example 23 is the method of Example 22, wherein the comparison of the planned output and the reachable set comprises determining if the planned output exceeds the reachable set.

Example 24 is the method of any of Examples 22-23, wherein the planned output includes one or more trajectories of the vehicle, the intrusion being identified if the one or more trajectories extends outside of the reachable set.

Example 25 is a non-transitory computer-readable storage medium with an executable computer program stored thereon, the program instructing a processor to perform the method of any of Examples 22-24.

Example 26 is a computer program product having a computer program which is directly loadable into a memory of a controller, when executed by the controller, causes the controller to perform the method of any of Examples 22-24.

Example 27 is a vehicle control system (VCS) for a vehicle, the VCS comprising: in-vehicle communication means; and intrusion detection means (IDM) for: calculating a planned output of the vehicle based on a message of a message stream received from at least one electronic control unit (ECU) coupled to the in-vehicle communication means; calculating a reachable set based on an uncertainty metric; and identifying an intrusion of the VCS based on a comparison of the planned output and the reachable set.

Example 28 is the VCS of Example 27, wherein the comparison of the planned output and the reachable set comprises determining if the planned output exceeds the reachable set.

Example 29 is the VCS of any of Examples 27-28, wherein the planned output includes one or more trajectories of the vehicle.

Example 30 is the VCS of Example 29, wherein the intrusion detection means identifies the intrusion if the one or more trajectories extends outside of the reachable set.

Example 31 is the VCS of any of Examples 27-30, wherein the intrusion detection means determines a source of the intrusion in response to identifying the intrusion.

Example 32 is the VCS of any of Examples 27-31, wherein the intrusion detection means determines a criticality of the intrusion in response to identifying the intrusion.

Example 33 is the VCS of Example 32, wherein the criticality of the intrusion is determined based on a safety model.

Example 34 is the VCS of any of Examples 27-33, wherein the intrusion detection means filters out one or more perception values or one or more actuation values from the message stream.

Example 35 is the VCS of any of Examples 27-34, wherein, based on a determined criticality of the intrusion, the intrusion detection means: controls the VCS to perform an emergency maneuver; or causes a handover of control of the vehicle to a driver.

Example 36 is the VCS of Example 35, wherein the intrusion detection means determines the criticality of the intrusion based on a safety model.

Example 37 is the VCS of any of Examples 27-36, wherein the message is perception data from at least one of the one more ECUs.

Example 38 is the VCS of any of Examples 27-37, wherein the uncertainty metric is a-priori uncertainty information corresponding to one or more of the at least one ECUs.

Example 39 is the VCS of any of Examples 27-38, wherein the intrusion detection means is implemented in another ECU coupled to the in-vehicle communication means.

Example 40 is the VCS of any of Examples 27-38, further comprising a plurality of
ECUs, wherein the intrusion detection means is implemented in a distributed configuration in at least two of the plurality of ECUs.

Example 41 is an apparatus as shown and described.

Example 42 is a method as shown and described.

Example 43 is a non-transitory computer-readable storage medium with an executable computer program stored thereon, the program instructing a processor to perform the method as shown and described.

Example 44 is a computer program product having a computer program which is directly loadable into a memory of a controller, when executed by the controller, causes the controller to perform the method as shown and described.

CONCLUSION

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," "processor circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, as described herein, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others. A processor or a controller can be "hard-coded" with instructions to perform corresponding function(s) according to aspects described herein. Alternatively, the processor or controller can access an internal and/or external memory to retrieve instructions stored in the memory, which when executed by the processor/controller, perform the corresponding function(s) associated with the processor/controller, and/or one or more functions and/or operations related to the operation of a component having the processor/controller included therein.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, semi-submersible, hovercraft, a drone, an aircraft, a rocket, a flying taxi, an unmanned aerial vehicle, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water, a submarine below the surface, or a semi-submersible. It is appreciated that some vehicles may be configured to operate as one of more of a ground, an aerial, and/or an aquatic vehicle.

The term "automated vehicle" or "autonomous vehicle" may describe a vehicle capable of implementing at least one navigational change without any occupant or manual input. A navigational change may describe or include a change in one or more of steering, braking, or acceleration/deceleration of the vehicle. A vehicle may be described as automated even in case the vehicle is not fully automatic (e.g., fully operational with occupant or without occupant input). Automated vehicles may include those vehicles that can operate under driver control during certain time periods and without driver control during other time periods. Automated vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Automated vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Automated vehicles may also include vehicles that control one or more aspects of vehicle navigation under certain circumstances, such as under certain environmental conditions (e.g., spatial areas, roadway conditions). In some aspects, automated vehicles may handle some or all aspects of braking, speed control, velocity control, and/or steering of the vehicle. An automated vehicle may include those vehicles that can operate without a driver. The level of automation of a vehicle may be described or determined in accordance with the levels of automation identified by the Society of Automotive Engineers (SAE) (e.g., as defined by the SAE, for example in SAE J3016 2018: Taxonomy and definitions for terms related to driving automation systems for on road motor vehicles) or by other relevant professional organizations. The SAE defined levels of automation may have a value ranging from a minimum level, e.g. level 0 (illustratively, substantially no driving automation), to a maximum level, e.g. level 5 (illustratively, full driving automation).

The term "ego vehicle" may be used to specify the vehicle that is the observer of all other actors, similar to how the driver of a vehicle observes all other traffic participants. From the perspective of the ego vehicle, all other traffic participants (vehicles, pedestrians, and so on) are the observed actors, or targets. Ego vehicle coordinates are centered and oriented with reference to the ego vehicle.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time varying features or data).

Various aspects herein may utilize one or more machine learning models to perform corresponding functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect.

Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

The invention claimed is:

1. A vehicle control system (VCS) for a vehicle, the VCS comprising:
    an in-vehicle bus; and
    an intrusion detection system (IDS) configured to:
        calculate a planned output of the vehicle based on a message of a message stream received from at least one electronic control unit (ECU) coupled to the in-vehicle bus;
        calculate a reachable set based on an uncertainty metric; and
        identify an intrusion of the VCS based on a comparison of the planned output and the reachable set.

2. The VCS of claim 1, wherein the comparison of the planned output and the reachable set comprises determining if the planned output exceeds the reachable set.

3. The VCS of claim 1, wherein the planned output includes one or more trajectories of the vehicle.

4. The VCS of claim 3, wherein the IDS is configured to identify the intrusion if the one or more trajectories extends outside of the reachable set.

5. The VCS of claim 1, wherein the IDS is further configured to determine a source of the intrusion in response to identifying the intrusion.

6. The VCS of claim 1, wherein the IDS is further configured to determine a criticality of the intrusion in response to identifying the intrusion.

7. The VCS of claim 6, wherein the criticality of the intrusion is determined based on a safety model.

8. The VCS of claim 1, wherein the IDS is further configured to filter out one or more perception values or one or more actuation values from the message stream.

9. The VCS of claim 1, wherein the IDS is further configured to, based on a determined criticality of the intrusion:
    control the VCS to perform an emergency maneuver; or
    cause a handover of control of the vehicle to a driver.

10. The VCS of claim 9, wherein the IDS is further configured to determine the criticality of the intrusion based on a safety model.

11. The VCS of claim 1, wherein the message is perception data from at least one of the one more ECUs.

12. The VCS of claim 1, wherein the uncertainty metric is a-priori uncertainty information corresponding to one or more of the at least one ECUs.

13. The VCS of claim 1, wherein the IDS is implemented in another ECU coupled to the in-vehicle bus.

14. The VCS of claim 1, further comprising a plurality of ECUs, wherein the IDS is implemented in a distributed configuration in at least two of the plurality of ECUs.

15. At least one non-transitory computer-readable medium including a set of instructions that, in response to being executed at an electronic control unit (ECU) among a plurality of ECUs connected to an in-vehicle bus of a vehicle control system (VCS), cause the respective ECU to:
    calculate a planned output of a vehicle based on a message of a message stream received from at least one of the plurality of ECU via the in-vehicle bus;
    calculate a reachable set based on an uncertainty metric; and
    identify an intrusion of the VCS based on a comparison of the planned output and the reachable set.

16. The medium of claim 15, wherein the comparison of the planned output and the reachable set comprises determining if the planned output exceeds the reachable set.

17. The medium of claim 15, wherein the planned output includes one or more trajectories of the vehicle.

18. The medium of claim 17, wherein the intrusion is identified if the one or more trajectories extends outside of the reachable set.

19. The medium of claim 15, further comprising determining a source of the intrusion in response to identifying the intrusion.

20. The medium of claim 15, further comprising determining a criticality of the intrusion in response to identifying the intrusion.

21. The medium of claim 15, wherein the uncertainty metric is a-priori uncertainty information corresponding to one or more of the at least one ECUs.

22. An intrusion detection method of a control system of a vehicle, the method comprising:
    calculating a planned output of the vehicle based on a message of a message stream received from at least one electronic control unit (ECU) coupled to an in-vehicle bus;
    calculating a reachable set based on an uncertainty metric; and
    comparing the planned output and the reachable set to identify an intrusion of the control system.

23. The method of claim 22, wherein the comparison of the planned output and the reachable set comprises determining if the planned output exceeds the reachable set.

24. The method of claim 22, wherein the planned output includes one or more trajectories of the vehicle, the intrusion being identified if the one or more trajectories extends outside of the reachable set.

* * * * *